(12) United States Patent
Clever et al.

(10) Patent No.: US 7,866,293 B2
(45) Date of Patent: Jan. 11, 2011

(54) CONCENTRIC CAMSHAFT WITH IMPROVED TORQUE RESISTANCE

(75) Inventors: Glenn E. Clever, Washington, MI (US); Roy Glenn Kaywood, Jackson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 412 days.

(21) Appl. No.: 12/046,798

(22) Filed: Mar. 12, 2008

(65) Prior Publication Data

US 2009/0229546 A1 Sep. 17, 2009

(51) Int. Cl.
*F01L 1/04* (2006.01)
(52) U.S. Cl. .................. 123/90.6; 123/90.44; 29/888.1
(58) Field of Classification Search ................. 123/90.6, 123/90.16, 90.31, 90.44; 29/888.1
See application file for complete search history.

(56) References Cited

U.S. PATENT DOCUMENTS

| 4,597,365 | A | 7/1986 | Madaffer |
| 4,993,282 | A * | 2/1991 | Swars ......................... 74/567 |
| 6,182,362 | B1 | 2/2001 | Lancefield |
| 6,247,436 | B1 | 6/2001 | Lancefield et al. |
| 6,253,719 | B1 | 7/2001 | Methley |
| 6,725,817 | B2 | 4/2004 | Methley et al. |
| 6,725,818 | B2 | 4/2004 | Methley |
| 7,210,440 | B2 | 5/2007 | Lawrence et al. |
| 7,305,953 | B2 * | 12/2007 | Walz ......................... 123/90.6 |
| 7,588,006 | B2 * | 9/2009 | Hentschel et al. .......... 123/90.6 |
| 2005/0226736 | A1 | 10/2005 | Lancefield et al. |
| 2006/0185471 | A1 | 8/2006 | Lawrence et al. |
| 2006/0207538 | A1 | 9/2006 | Lancefield et al. |
| 2007/0119402 | A1 | 5/2007 | Lancefield et al. |

FOREIGN PATENT DOCUMENTS

| EP | 1473443 | | 3/2004 |
| GB | 2424257 | A * | 9/2006 |
| WO | WO2006/067519 | | 6/2006 |
| WO | WO2006/097767 | | 9/2006 |
| WO | WO2007/052075 | | 5/2007 |

* cited by examiner

*Primary Examiner*—Ching Chang
(74) *Attorney, Agent, or Firm*—Harness, Dickey & Pierce, P.L.C.

(57) ABSTRACT

An engine assembly may include an engine structure and a camshaft supported on the engine structure. The camshaft may include a first shaft, a first lobe member fixed to the first shaft and including a bore and first and second lobe portions that are axially spaced from one another and fixed to one another. The bore may include a first radial inner surface at the first lobe portion and a second radial inner surface at the second lobe portion.

20 Claims, 4 Drawing Sheets

US 7,866,293 B2

CONCENTRIC CAMSHAFT WITH IMPROVED TORQUE RESISTANCE

FIELD

The present disclosure relates to engine camshaft assemblies, and more specifically to concentric camshaft assemblies.

BACKGROUND

The statements in this section merely provide background information related to the present disclosure and may not constitute prior art.

Engines typically include a camshaft to actuate intake and exhaust valves. Some camshafts are concentric camshafts that provide for relative rotation between the intake and exhaust lobes. The intake lobes may be fixed to an outer shaft for rotation with the shaft and the exhaust lobes may be rotatably supported on the shaft. Alternatively, the exhaust lobes may be fixed to the outer shaft for rotation with the shaft and the intake lobes may be rotatably supported on the shaft. In either arrangement, the lobes that are fixed to the outer shaft may be fixed to the outer shaft through a frictional engagement. Typically, lobes are individually fixed to the outer shaft.

SUMMARY

An engine assembly may include an engine structure and a camshaft supported on the engine structure. The camshaft may include a first shaft, a first lobe member fixed to the first shaft and including a bore and first and second lobe portions that are axially spaced from one another and fixed to one another. The bore may include a first radial inner surface at the first lobe portion and a second radial inner surface at the second lobe portion.

A method may include forming a single-piece lobe member of an engine camshaft having first and second lobe portions and a bore extending through the lobe member. The bore may include a first radial inner surface at the first lobe member and a second radial inner surface at the second lobe member. The method may further include locating the lobe member on a first shaft and biasing one of the bore and the first shaft into engagement with the other of the bore and the first shaft to provide a frictional engagement between the first and second radial inner surfaces of the lobe member and an outer surface of the first shaft.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
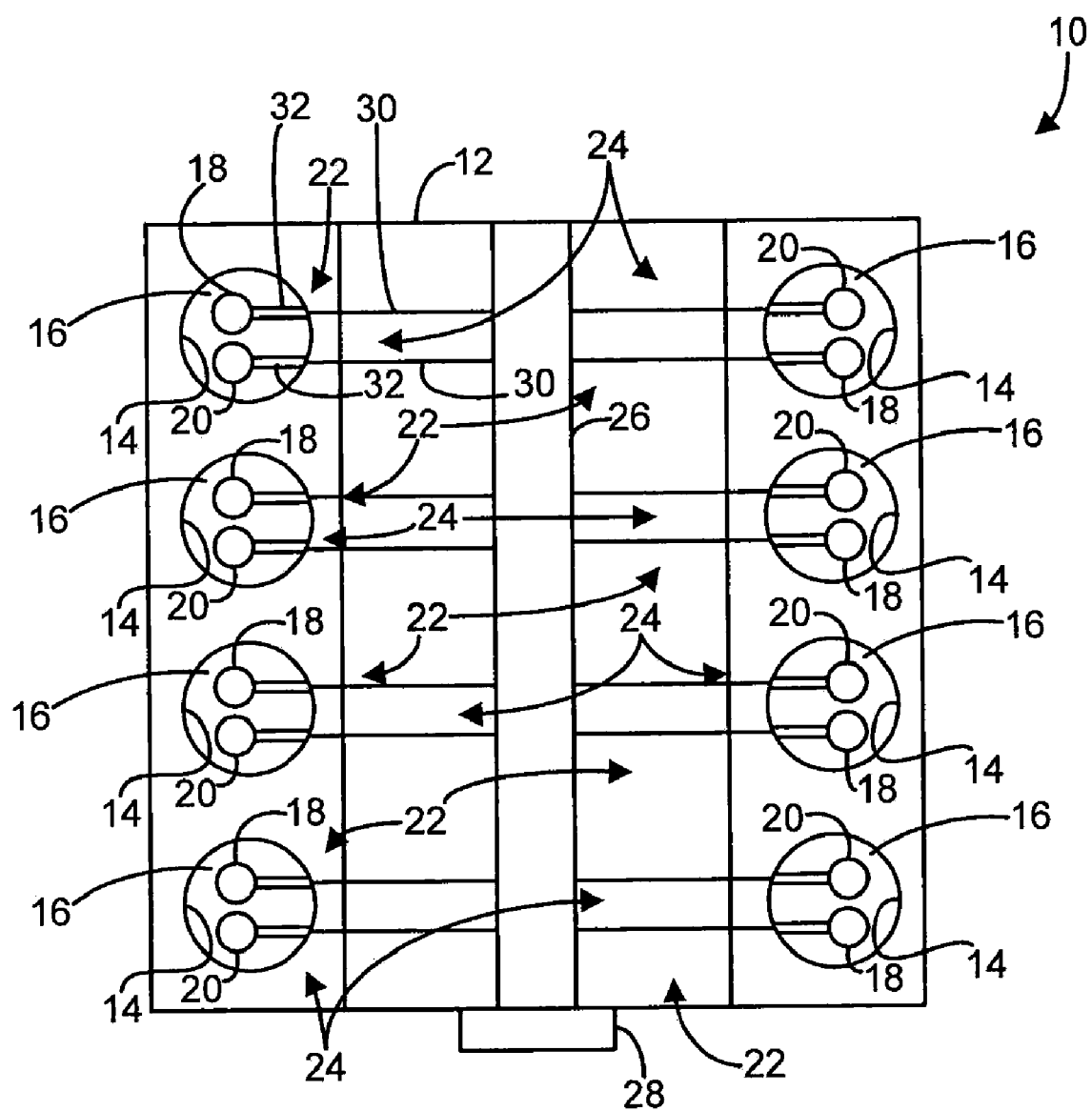
FIG. 1 is a schematic illustration of an engine assembly according to the present disclosure.

The following description is merely exemplary in nature and is not intended to limit the present disclosure, application, or uses. It should be understood that throughout the drawings, corresponding reference numerals indicate like or corresponding parts and features.

Referring now to FIG. 1, an exemplary engine assembly 10 is schematically illustrated. The engine assembly 10 may include an engine 12 including a plurality of cylinders 14 having pistons 16 disposed therein. The engine 12 may further include an intake valve 18, an exhaust valve 20, and intake and exhaust valve lift mechanisms 22, 24 for each cylinder 14, as well as a camshaft 26 and a cam phaser 28.

The intake valve lift mechanism 22 may include a pushrod 30 and a rocker arm 32. The exhaust valve lift mechanism 24 may additionally include a pushrod 30 and a rocker arm 32. Pushrods 30 may be engaged with the camshaft 26 to actuate the rocker arms 32 and selectively open the intake and exhaust valves 18, 20. While the engine assembly 10 is illustrated as a pushrod engine, it is understood that the present disclosure may be applicable to a variety of other engine configurations as well, such as overhead cam engines.

Figure 2:
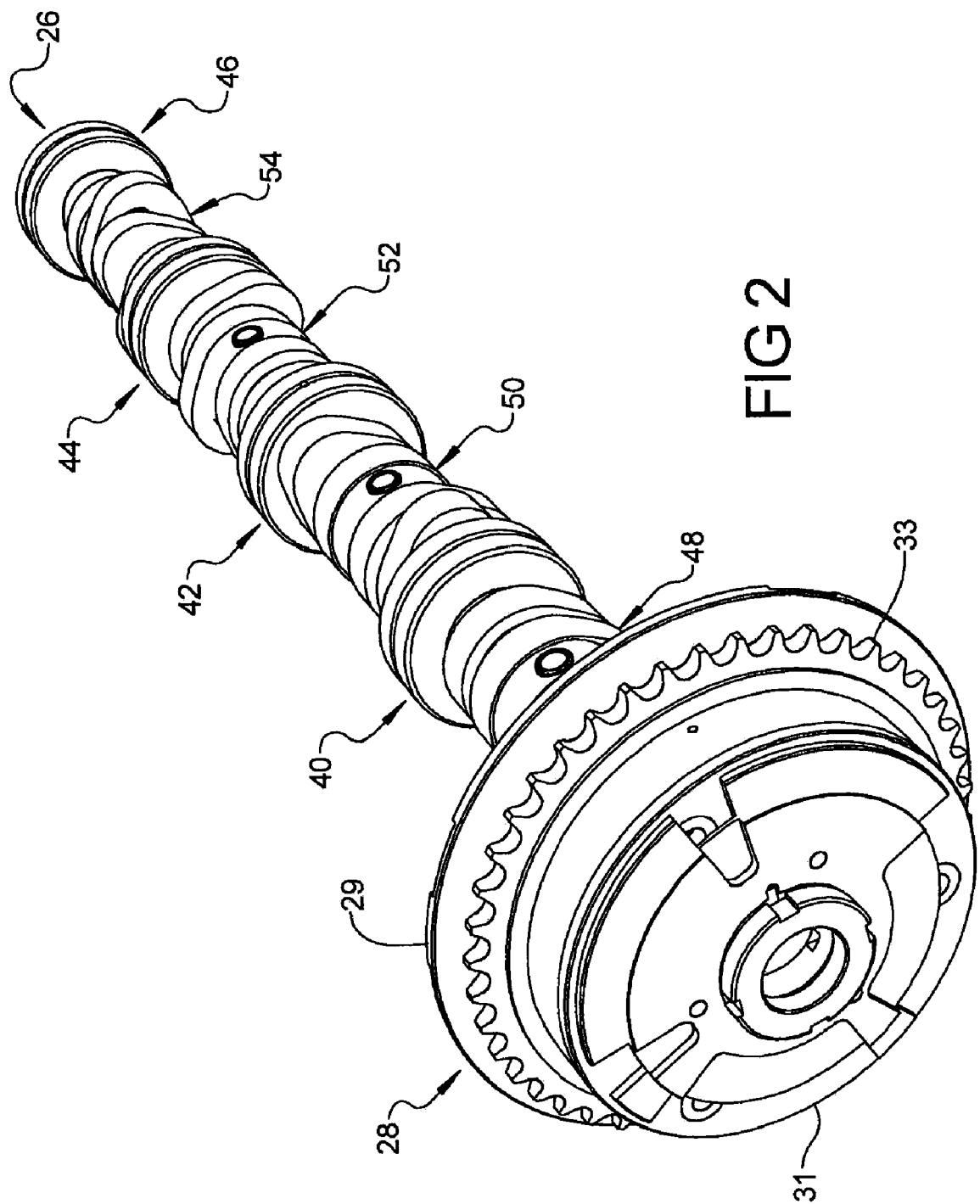
FIG. 2 is a perspective view of the camshaft and cam phaser of FIG. 1.
Figure 3:
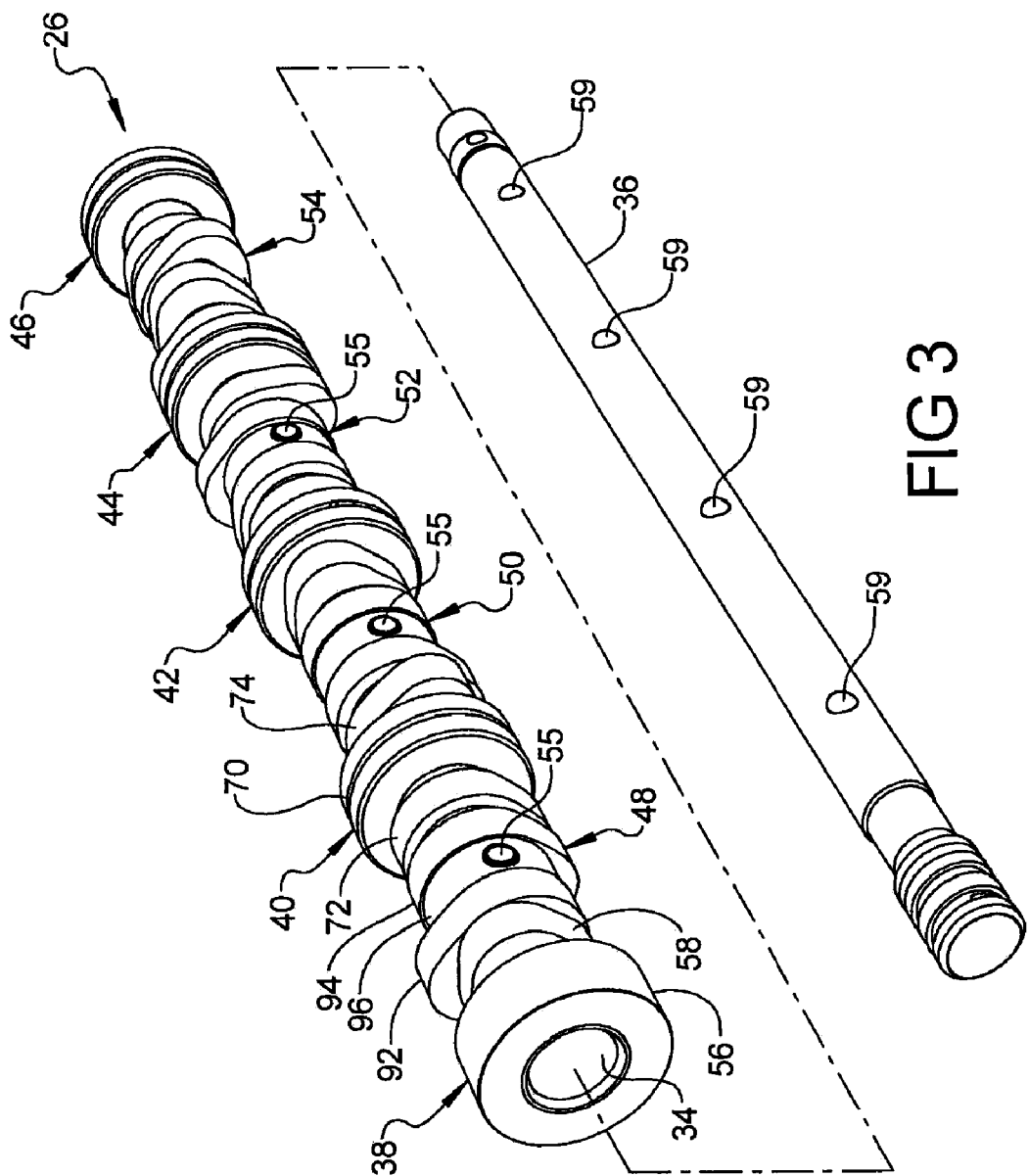
FIG. 3 is a perspective exploded view of the camshaft of FIG. 1.
Figure 4:
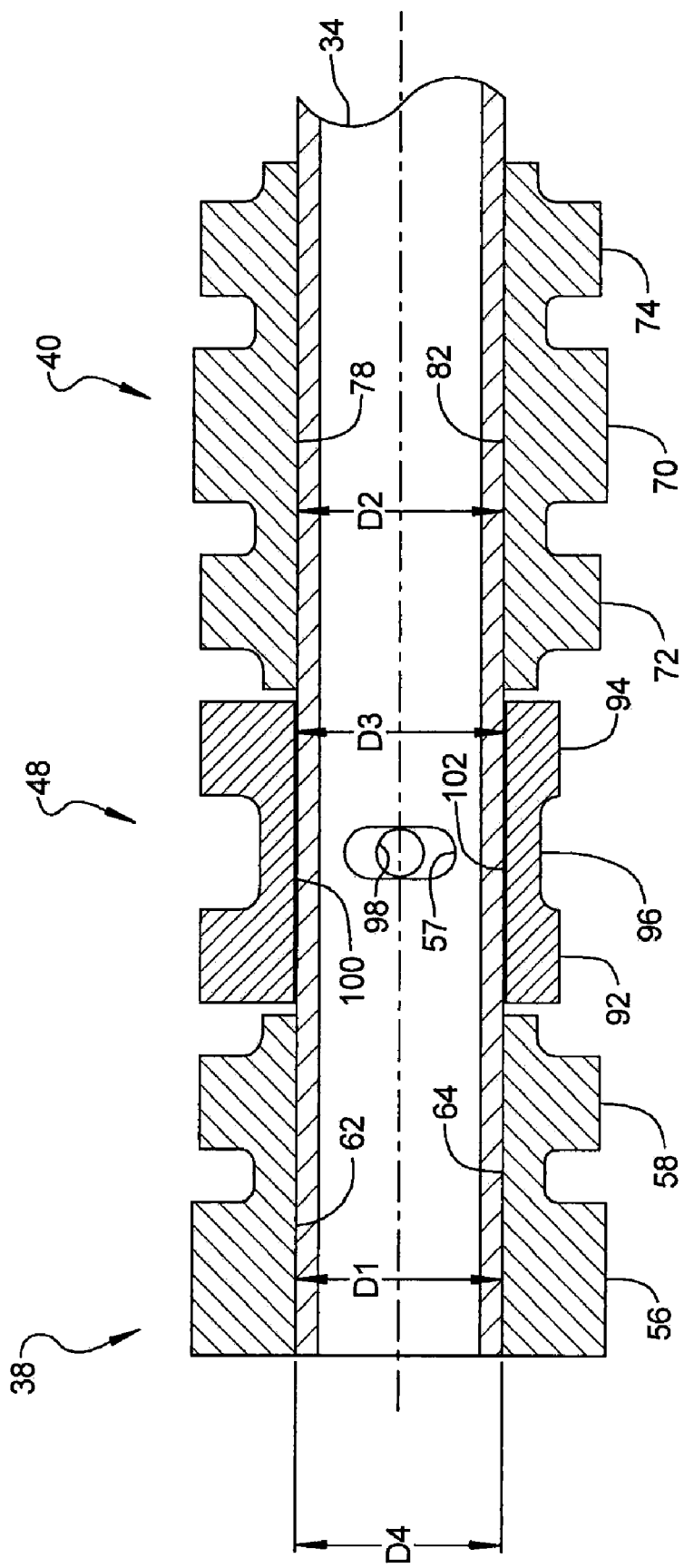
FIG. 4 is a fragmentary section view of the camshaft of FIG. 1.

With reference to FIGS. 2-4, the camshaft 26 may include first and second shafts 34, 36, a first set of lobe members 38, 40, 42, 44, 46, a second set of lobe members 48, 50, 52, 54, and drive pins 55. In the present example, the first set of lobe members 38, 40, 42, 44, 46 may form an intake lobe set and the second set of lobe members 48, 50, 52, 54 may form an exhaust lobe set. However, it is understood that alternate arrangements may be provided where the first set of lobe members 38, 40, 42, 44, 46 may form an exhaust lobe set and the second set of lobe members 48, 50, 52, 54 may form an intake lobe set. The first shaft 34 may be fixed for rotation with a first phaser member 29 and the second shaft 36 may be fixed for rotation with a second phaser member 31. The first and second phaser members 29, 31 may be rotatable relative to one another and relative to a rotationally driven member 33 of the phaser 28.

The second shaft 36 may be rotatably disposed within the first shaft 34. The first shaft 34 may include slots 57 therethrough and the second shaft 36 may include apertures 59 that receive the pins 55 therein and couple the second set of lobe members 48, 50, 52, 54 for rotation with the second shaft 36. The slots 57 in the first shaft 34 may generally allow for a rotational travel of the pins 55 therein.

The first set of lobe members 38, 40, 42, 44, 46 may be fixed for rotation with the first shaft 34. The engagement between the first set of lobe members 38, 40, 42, 44, 46 and the first shaft 34 may include a friction fit engagement. The second set of lobe members 48, 50, 52, 54 may be disposed between adjacent ones of the first set of lobe members 38, 40, 42, 44, 46.

The lobe members 38 and 46 may be generally similar to one another. Therefore, the lobe member 38 will be described with the understanding that the description applies equally to the lobe member 46. With additional reference to FIG. 4, the lobe member 38 may include a journal portion 56 and a lobe portion 58. The lobe member 38 may be formed as a single-piece part. Therefore, the journal portion 56 and the lobe portion 58 may be fixed to one another. The lobe member 38 may include a bore 62 defining first inner diameter (D1) and a radial inner surface 64 at the journal and lobe portions 56, 58.

The lobe members 40, 42, 44 may be generally similar to one another. Therefore, the lobe member 40 will be described with the understanding that the description applies equally to the lobe members 42, 44. The lobe member 40 may include a journal portion 70 and first and second lobe portions 72, 74. The journal portion 70 may form a connecting portion between the first and second lobe portions 72, 74. The lobe member 40 may be formed as a single-piece part. Therefore, the journal portion 70 and the first and second lobe portions 72, 74 may be fixed to one another. The lobe member 40 may include a bore 78 defining a second inner diameter (D2) and a radial inner surface 82 at the journal and lobe portions 70, 72, 74.

The lobe members 48, 50, 52 may be generally similar to one another. Therefore, the lobe member 48 will be described with the understanding that the description applies equally to the lobe members 50, 52. The lobe member 48 may include first and second lobe portions 92, 94 and a connecting portion 96 extending axially between the first and second lobe portions 92, 94 and fixing the first and second lobe portions 92, 94 to one another. The lobe member 48 may be a single-piece part. Therefore, the first and second lobe portions 92, 94 and the connecting portion 96 may be fixed to one another. The connecting portion 96 may generally form a fixation region for the lobe member 48 and may include an aperture 98 that receives the pin 55 to couple the lobe member 48 to the second shaft 36. The lobe member 48 may include a bore 100 defining a third inner diameter (D3) and a radial inner surface 102.

The lobe member 48 may be rotationally supported on the first shaft 34 and the lobe members 38, 40 may be rotationally fixed on the first shaft 34. The lobe members 38, 40 may be frictionally engaged with the first shaft 34. For example, the first shaft 34 may have an outer diameter (D4) that is less than the third inner diameter (D3) and approximately equal to the first and second inner diameters (D1, D2).

A variety of processes may be used to create the frictional engagement. For example, the lobe members 38, 40 may be heated to expand the bores 62, 78 before locating the lobe members on the first shaft 34. Once the lobe members 38, 40 are located on the first shaft 34, the lobe members 38, 40 may be cooled. When cooled, the bores 62, 78 of the lobe members 38, 40 may return to their initial size to form a frictional engagement with the first shaft 34. Alternatively, the first shaft may be cooled to shrink the outer diameter of the first shaft 34 before locating the lobe members 38, 40 on the first shaft 34. Once the lobe members 38, 40 are located on the first shaft 34, the first shaft 34 may be heated. When heated, the outer diameter of first shaft 34 may return to the initial size to form a frictional engagement with the lobe members 38, 40. In another method, the lobe members 38, 40 may be located on the first shaft 34 and a radial outward force may be applied within the first shaft to bias the first shaft 34 into engagement with the lobe members 38, 40. The radial outward force may be applied by a variety of processes including ballizing.

As such, the lobe members 38, 40 may have an increased torsional resistance relative to traditional camshafts that have individual lobes fixed to the shaft. The fixation between the journal portion 56 and the lobe portion 58 of the lobe member 38 and the fixation between the journal portion 70 and the first and second lobe portions 72, 74 of the lobe member 40 may provide increased surface areas for engagement with the first shaft 34. The increased surface area engagement generally provides a greater frictional engagement between the lobe members 38, 40 and the first shaft 32, and therefore a greater torsional resistance.

What is claimed is:

1. A camshaft comprising:
   a first shaft; and
   a first lobe member including a bore and first and second lobe portions that are axially spaced from one another and fixed to one another by a connecting portion extending axially between the first and second lobe portions, the first shaft being located within the bore and frictionally engaged with the first lobe member at the first and second lobe portions and the connecting portion to fix the first lobe member to the first shaft.

2. The camshaft of claim 1, wherein the first lobe member is a single-piece part having the first and second lobe portions integrally formed with one another.

3. The camshaft of claim 1, wherein the bore defines a first radial inner surface at the first lobe portion and a second radial inner surface at the second lobe portion, the first and second radial inner surfaces are frictionally engaged with an outer surface of the first shaft to produce a torsional resistance between the first lobe member and the first shaft.

4. The camshaft of claim 3, wherein the bore includes a third radial inner surface area at the connecting portion that is frictionally engaged with the outer surface of the first shaft.

5. The camshaft of claim 1, wherein the connecting portion includes a journal portion that is rotatably supported by an engine structure.

6. The camshaft of claim 1, further comprising a second shaft and a second lobe member, the first shaft including a bore therethrough and the second shaft being disposed within the bore for rotation relative to the first shaft, the second lobe member being located on the first shaft and fixed for rotation with the second shaft.

7. The camshaft of claim 1, wherein the first lobe member is a monolithic body defining the first and second lobe portions and the connecting portion.

8. An engine assembly comprising:
   an engine structure; and
   a camshaft supported on the engine structure and including:
      a first shaft; and
      a first lobe member including a bore and first and second lobe portions that are axially spaced from one another and fixed to one another by a connecting portion extending axially between the first and second lobe portions, the first shaft being located within the bore and frictionally engaged with the first lobe member at the first and second lobe portions and the connecting portion to fix the first lobe member to the first shaft.

9. The engine assembly of claim 8, wherein the first lobe member is a single-piece part having the first and second lobe portions integrally formed with one another.

10. The engine assembly of claim 8, wherein the bore defines a first radial inner surface at the first lobe portion and a second radial inner surface at the second lobe portion, the first and second radial inner surfaces are frictionally engaged with an outer surface of the first shaft to produce a torsional resistance between the first lobe member and the first shaft.

11. The engine assembly of claim 10, wherein the bore includes a third radial inner surface area at the connecting portion that is frictionally engaged with the outer surface of the first shaft.

12. The engine assembly of claim 8, wherein the connecting portion includes a journal portion that is rotatably supported by the engine structure.

13. The engine assembly of claim 8, further comprising a cam phaser, a second shaft, and a second lobe member, the first shaft including a bore therethrough and the second shaft being disposed within the bore for rotation relative to the first shaft, the second lobe member being located on the first shaft and fixed for rotation with the second shaft, and the cam phaser being coupled to the camshaft to rotate the second shaft relative to the first shaft.

14. The engine assembly of claim 8, wherein the first lobe member is a monolithic body defining the first and second lobe portions and the connecting portion.

15. A method comprising:
forming a single-piece lobe member of an engine camshaft having first and second lobe portions, a connecting portion extending axially between the first and second lobe portions, and a bore extending through the single-piece lobe member;
locating the single-piece lobe member on a first shaft; and
biasing one of the bore and the first shaft into engagement with the other of the bore and the first shaft to provide a frictional engagement between an outer surface of the first shaft and the bore at the first and second lobe portions and the connecting portion.

16. The method of claim 15, further comprising heating the single-piece lobe member to expand the bore of the single-piece lobe member before locating the single-piece lobe member on the first shaft, the biasing including cooling the single-piece lobe member after the locating.

17. The method of claim 15, further comprising cooling the first shaft to reduce the diameter of the first shaft before locating the single-piece lobe member on the first shaft, the biasing including heating the first shaft after the locating.

18. The method of claim 15, wherein the biasing includes applying a radial outward biasing force from within a bore of the first shaft to provide the frictional engagement.

19. The method of claim 15, further comprising locating a second shaft within a bore of the first shaft for rotation relative to the first shaft.

20. The method of claim 19, further comprising locating an additional lobe member on the first shaft and fixing the additional lobe member to the second shaft.

* * * * *